(12) United States Patent
Barker

(10) Patent No.: US 9,289,709 B2
(45) Date of Patent: Mar. 22, 2016

(54) DEVICE TO REMOVE PARTICLES FROM A GAS STREAM

(75) Inventor: Mario J. C. Barker, Birmingham (GB)

(73) Assignees: Insite Products PTY Limited, Vaucluse, NSW (AU); Mario John Chaves Barker, Warwickshire (GB)

( * ) Notice: Subject to any disclaimer, the term of this patent is extended or adjusted under 35 U.S.C. 154(b) by 368 days.

(21) Appl. No.: 13/819,042

(22) PCT Filed: Aug. 23, 2011

(86) PCT No.: PCT/AU2011/001084
§ 371 (c)(1),
(2), (4) Date: May 10, 2013

(87) PCT Pub. No.: WO2012/024727
PCT Pub. Date: Mar. 1, 2012

(65) Prior Publication Data
US 2013/0219843 A1 Aug. 29, 2013

(30) Foreign Application Priority Data
Aug. 26, 2010 (AU) ................. 2010903833

(51) Int. Cl.
*B01D 46/18* (2006.01)
*B01D 45/14* (2006.01)
*B01D 45/08* (2006.01)
*B01D 45/16* (2006.01)
(Continued)

(52) U.S. Cl.
CPC ........... *B01D 45/14* (2013.01); *B01D 45/08* (2013.01); *B01D 45/16* (2013.01); *A47L 9/1683* (2013.01); *F01M 2013/0422* (2013.01)

(58) Field of Classification Search
CPC ........ B01D 45/14; B01D 45/08; B01D 45/16; A47L 9/1683; F01M 2013/0422
USPC ....... 55/423, 400–409, 432, 433, DIG. 3, 428
See application file for complete search history.

(56) References Cited

U.S. PATENT DOCUMENTS 1,908,181 A * 5/1933 Prouty ............................ 241/61
2,662,610 A * 12/1953 Heinrich ......................... 55/347
(Continued)

FOREIGN PATENT DOCUMENTS

| CN | 1515789 | 7/2004 |
| CN | 1572221 | 2/2005 |

(Continued)

OTHER PUBLICATIONS

International Search Report for Application No. PCT/AU2011/001084 dated Oct. 28, 2011 (3 pages).
(Continued)

*Primary Examiner* — Dung H Bui
(74) *Attorney, Agent, or Firm* — Keusey & Associates, P.C.

(57) ABSTRACT

A device to separate particles from a gas stream. The device may be a vacuum cleaner (10) or an industrial dust extraction device. The vacuum cleaner (10) includes a rotor assembly (20) to which the gas stream is delivered, the rotor assembly (20) having a plurality of gates (42) that collect dust and open to deliver dust to an outlet chamber (23). The gates (42) include one or more gates (42) that may include a resilient deflectable flange that is movable between an open and a closed position to provide for passage of the dust to the chamber (23).

10 Claims, 11 Drawing Sheets

(51) Int. Cl.
  *A47L 9/16* (2006.01)
  *F01M 13/04* (2006.01)

(56) References Cited

U.S. PATENT DOCUMENTS

| | | | |
|---|---|---|---|
| 3,095,289 A | 6/1963 | Egan | |
| 3,150,944 A | 9/1964 | Nerad | |
| 3,234,716 A * | 2/1966 | Sevin et al. | 210/360.1 |
| 3,653,188 A | 4/1972 | Fisher et al. | |
| 4,098,594 A | 7/1978 | Shorr et al. | |
| 4,162,906 A | 7/1979 | Sullivan et al. | |
| 4,655,806 A | 4/1987 | Bowersox | |
| 5,215,553 A * | 6/1993 | Herman et al. | 95/269 |
| 6,243,912 B1 | 6/2001 | Grey | |
| 2003/0136094 A1 * | 7/2003 | Illingworth et al. | 55/406 |
| 2004/0118091 A1 * | 6/2004 | Illingworth et al. | 55/406 |
| 2007/0186372 A1 | 8/2007 | Rowntree et al. | |

FOREIGN PATENT DOCUMENTS

| | | |
|---|---|---|
| EP | 1273335 A2 | 8/2003 |
| GB | 1182772 | 3/1970 |
| WO | 2009026611 | 3/2009 |

OTHER PUBLICATIONS

Chinese Patent Office Action for Application No. 201180052066.X dated Jun. 19, 2014 (14 pages).

* cited by examiner

DEVICE TO REMOVE PARTICLES FROM A GAS STREAM

TECHNICAL FIELD

The present invention relates to devices to separate material such as dust from a gas stream, and more particularly but not exclusively to vacuum cleaners.

BACKGROUND OF THE INVENTION

There are various devices used to remove particles from air streams. Typically, in industrial applications, the devices are "cyclonic" devices that cause an air stream to rotate within a hollowed body so that particles move radially outward and engage the wall of the body so as to be removed.

Vacuum cleaners also use cyclonic devices and/or filters to remove particles and/or filaments. However, typically, domestic vacuum cleaners, and vacuum cleaners employed by professional cleaning staff, include at least one filter through which the air passes before it exits via the exhaust of the vacuum cleaner.

A disadvantage of "cyclonic" separators is that they do not remove all the material required. To address this issue, frequently filters are added at a position downstream of the "cyclonic" separator. However, this combination suffers from the disadvantage that the filters become blocked and the efficiency of the device diminishes.

The centrifugal systems also employ a filter located generally downstream of the main centrifugal part of the system. These filters also become blocked and therefore this is a disadvantage since flow rates through the system diminish.

The abovementioned "cyclonic" separators has a further disadvantage in that they operate efficiently only within relatively narrow ranges of operating conditions. For example, if air flow rates diminish, the separators become inefficient.

Object of the Invention

It is the object of the present invention to overcome or substantially ameliorate at least one of the above disadvantages.

SUMMARY OF THE INVENTION

There is disclosed herein a device to separate particles from a gas stream, the device including:
a chamber having an inlet and an outlet between which the gas flows in a predetermined direction through the chamber;
a rotor mounted in the chamber for rotation about a rotation axis, the rotor including,
a longitudinal passage extending through the rotor along which air passes in moving from the inlet to the outlet of the chamber, and
a plurality of gates located radially outward of the passage which collect the particles from gas passing through the passage, the gates being operable to move between a closed position collecting the particles, and an open position providing for delivery of collected particles from a position exterior of the passage; and
a cavity into which the particles is delivered from the gates.

Preferably, each gate includes an upstream gate portion and a downstream gate portion, with the upstream gate portion being operable in an open position and a closed position, with the upstream gate portion in the open position providing for the flow of particles to the downstream gate portion, with the downstream gate portion being operable in an open position and a closed position, with the downstream gate portion in the open position providing for the delivery of particles to said cavity.

Preferably, each gate is annular in configuration.

Preferably, each gate includes a resilient flange resiliently urged to the closed position.

In an alternative preferred form, each gate includes a gate member angularly movable to provide for the passage of particles past the gate.

In a still further alternative preferred form, each gate includes an annular resilient flange having an upstream portion and a downstream portion, each portion being resilient movable between an open position and a closed position.

Preferably, said inlet includes an inlet duct causing the gas stream to follow an arcuate path to urge particles in a predetermined direction, and said device further includes an inlet gate which collects particles, the inlet gate being operable in an open position and a closed position, with the inlet gate in the open position providing for the removal of particles from the gas stream.

Preferably, said inlet includes a plurality of bars on said path between which the gas stream passes, with the bars being adapted to engage particles to aid in removing particles from the gas stream for delivery to said inlet gate.

Preferably, said inlet includes an upstream inlet portion and a downstream inlet portion, said downstream inlet portion communicating with said rotor and causing particles to pass along an arcuate path to urge particles in a predetermined direction so as not to enter the rotor.

Preferably, said cavity is a first chamber to receive the particles, and said device includes a second chamber, with said first chamber being in communication with the downstream inlet portion so as to receive particles therefrom, and a second chamber, the second chamber communicating with the upstream inlet portion so as to receive particles therefrom.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENTS

Figure 1:
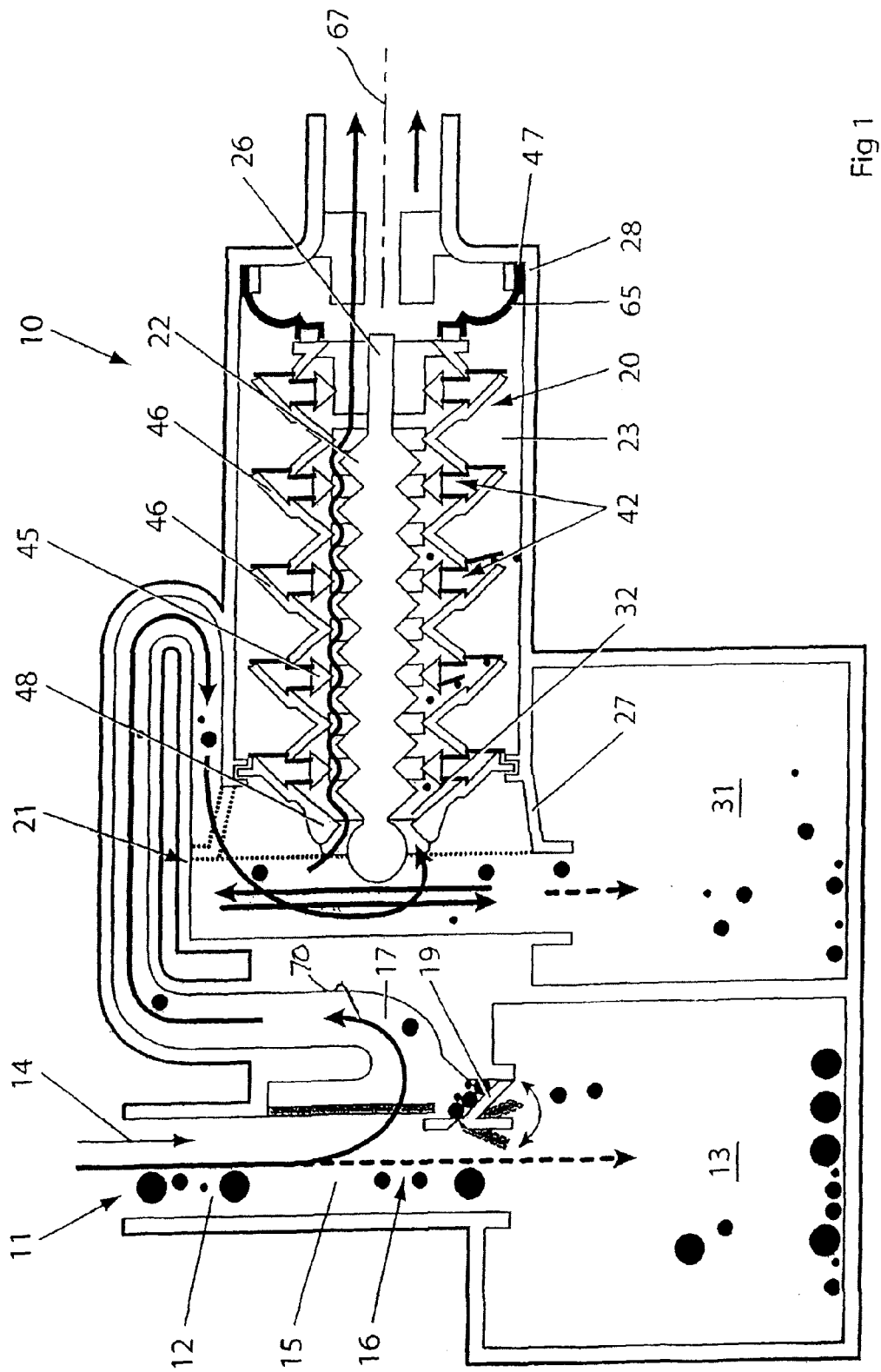
FIG. 1 is a schematic sectioned side elevation of a vacuum cleaner.

In the accompanying drawings there is a schematically depicted a vacuum cleaner 10. The vacuum cleaner 10 includes an inlet 11 to which air containing particles 12 is delivered. The inlet 11 communicates with a first particle chamber 13 to which heavier particles are delivered. Air enters the inlet 11 in the direction 14 so the heavier particles 12 are directed towards the chamber 13 to be collected therein. The chamber 13 would have a removable wall and/or maybe removable in its entirety to provide for emptying of the chamber 13.

Figure 9:
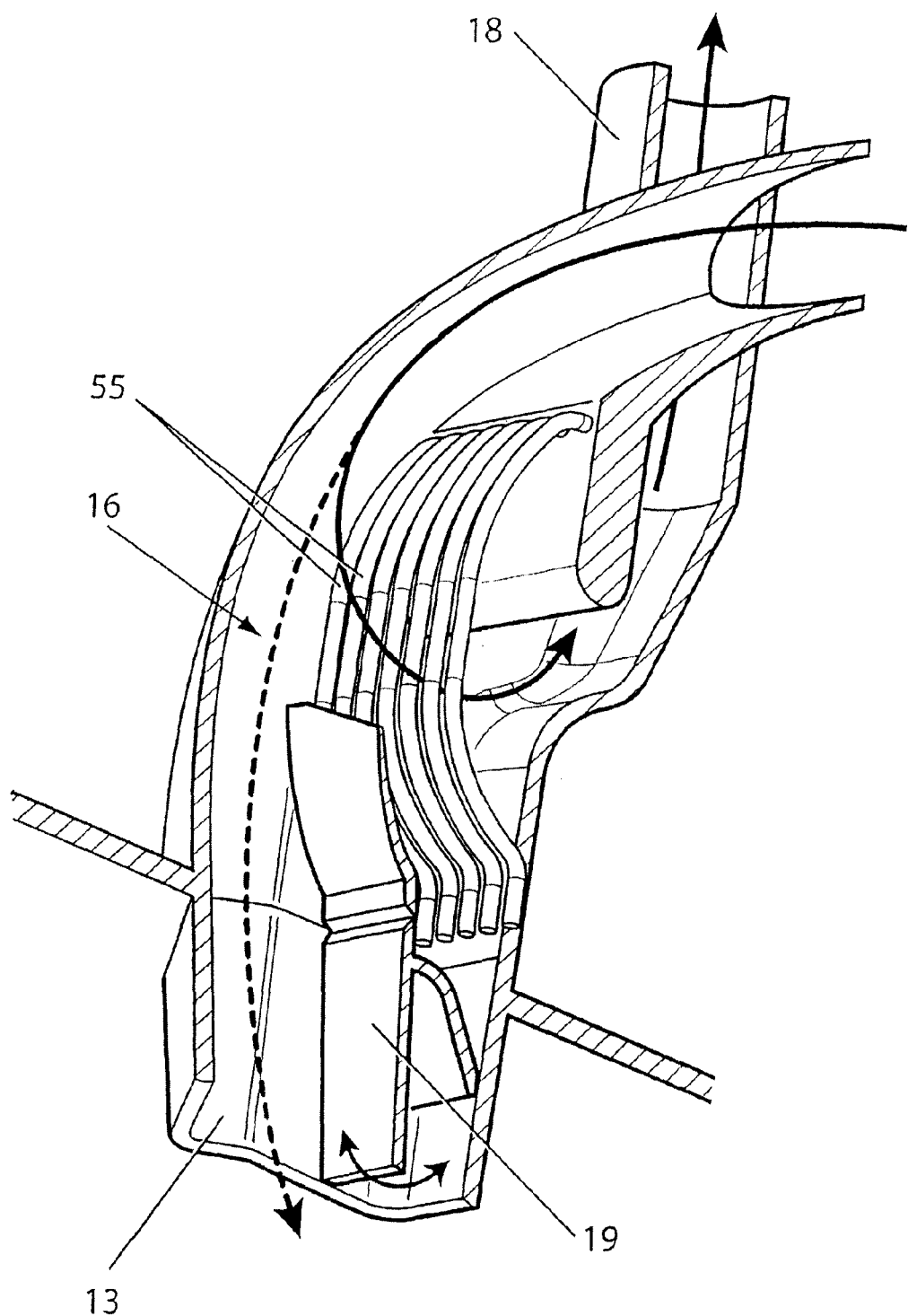
FIG. 9 is a schematic part section isometric view of an upper stream portion of the vacuum cleaner of FIG. 1.

Air entering into the inlet 11 passes along a first duct 15 with an outlet 16 (more fully depicted in FIG. 9). Air leaving the outlet 16 moves angularly into a second duct 17. As the air accelerates to change direction to the direction 70, again particles are caused to move into engagement with an inlet gate 19. As an example, the gate 19 may be movable angularly from a closed (collecting) position, to an open position at which the particles are delivered to the chamber 13. The gate 19 may be opened as a result of weight of the particles engaged by the gate 19, or maybe mechanically opened. Preferably, the gate 19 would be urged to the closed position.

Figure 2:
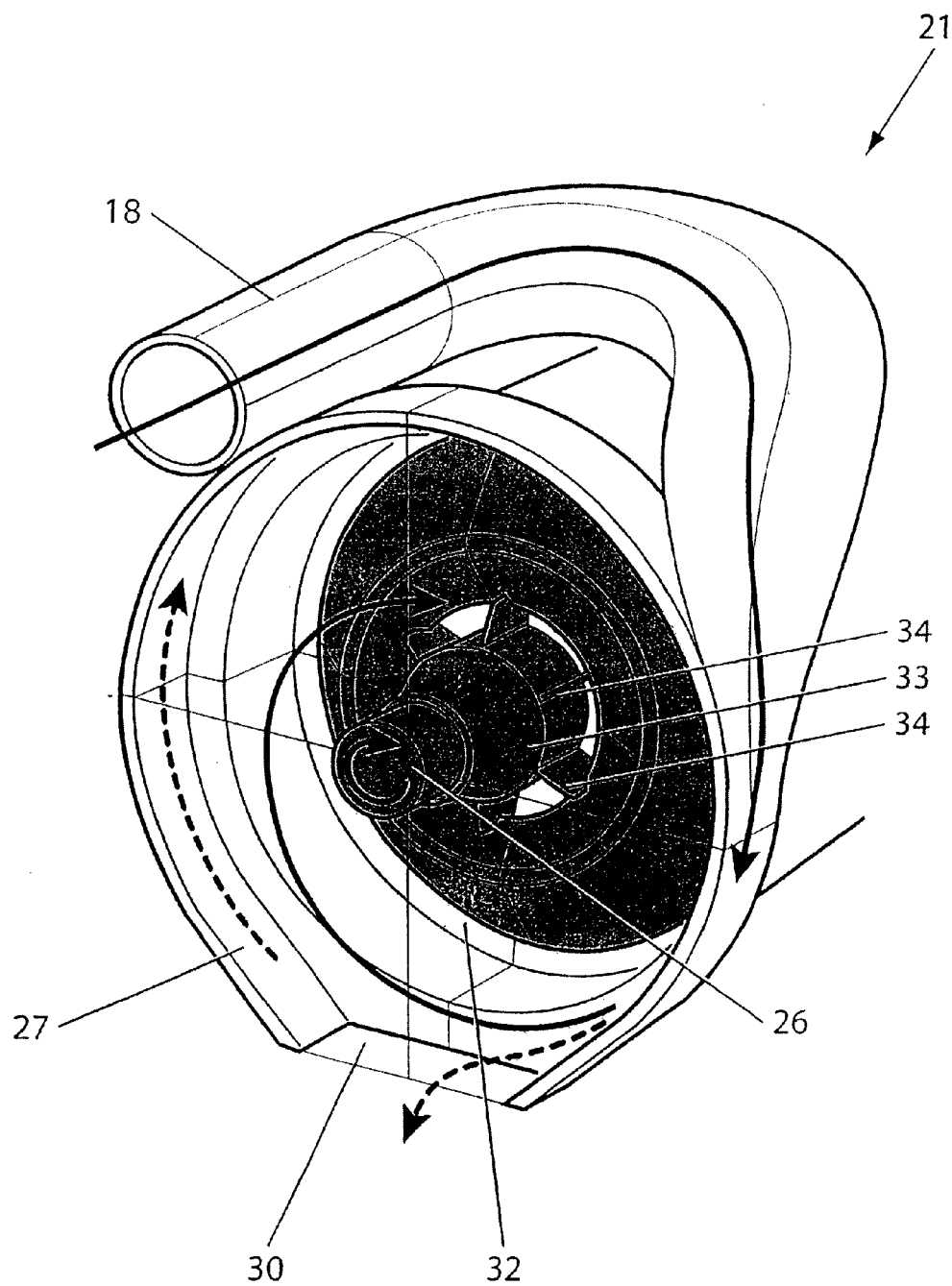
FIG. 2 is a schematic isometric view of a portion of a vacuum cleaner of FIG. 1.
Figure 3:
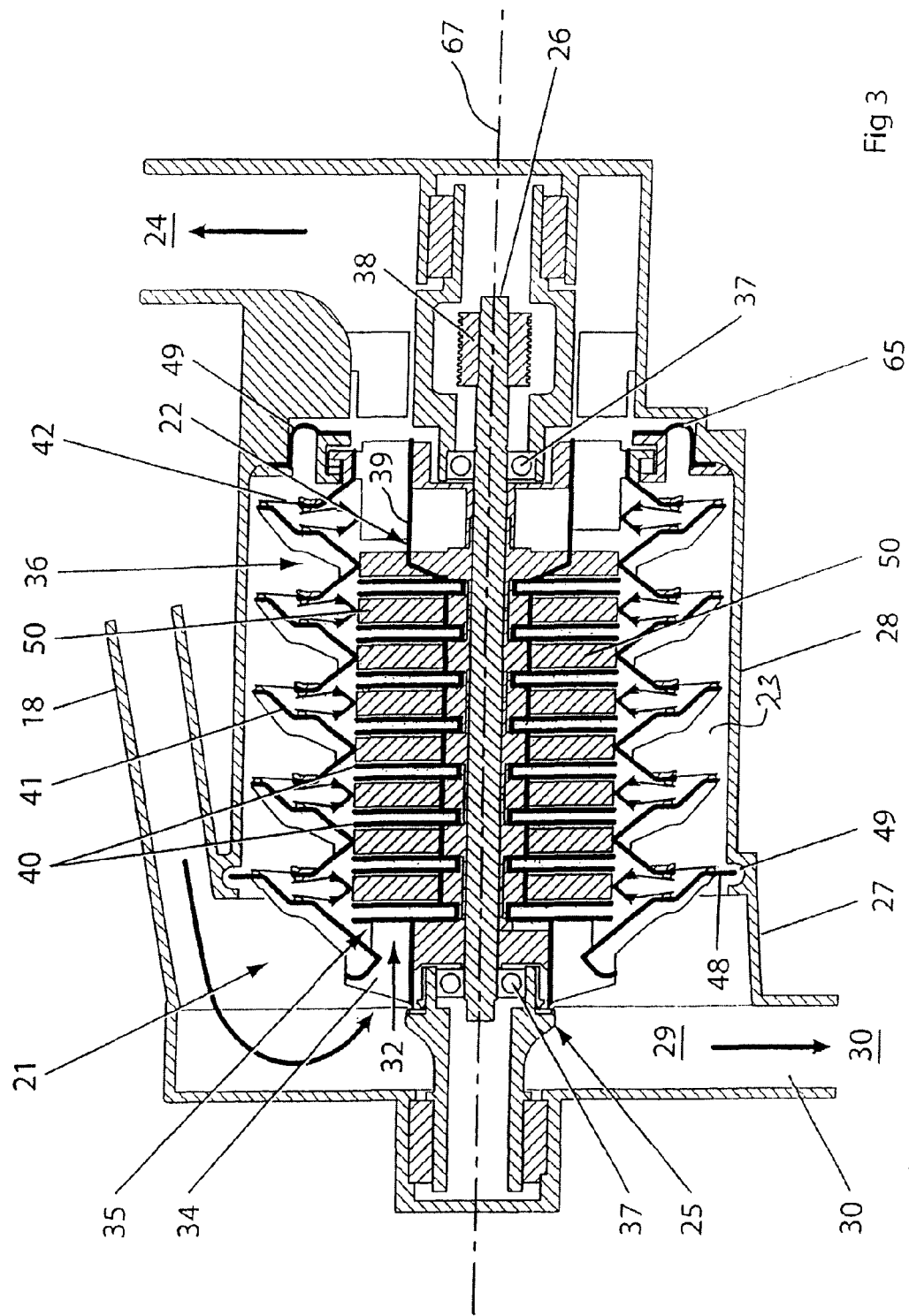
FIG. 3 is a schematic section side elevation of a rotor assembly employed in the vacuum cleaner of FIG. 1.
Figure 4:
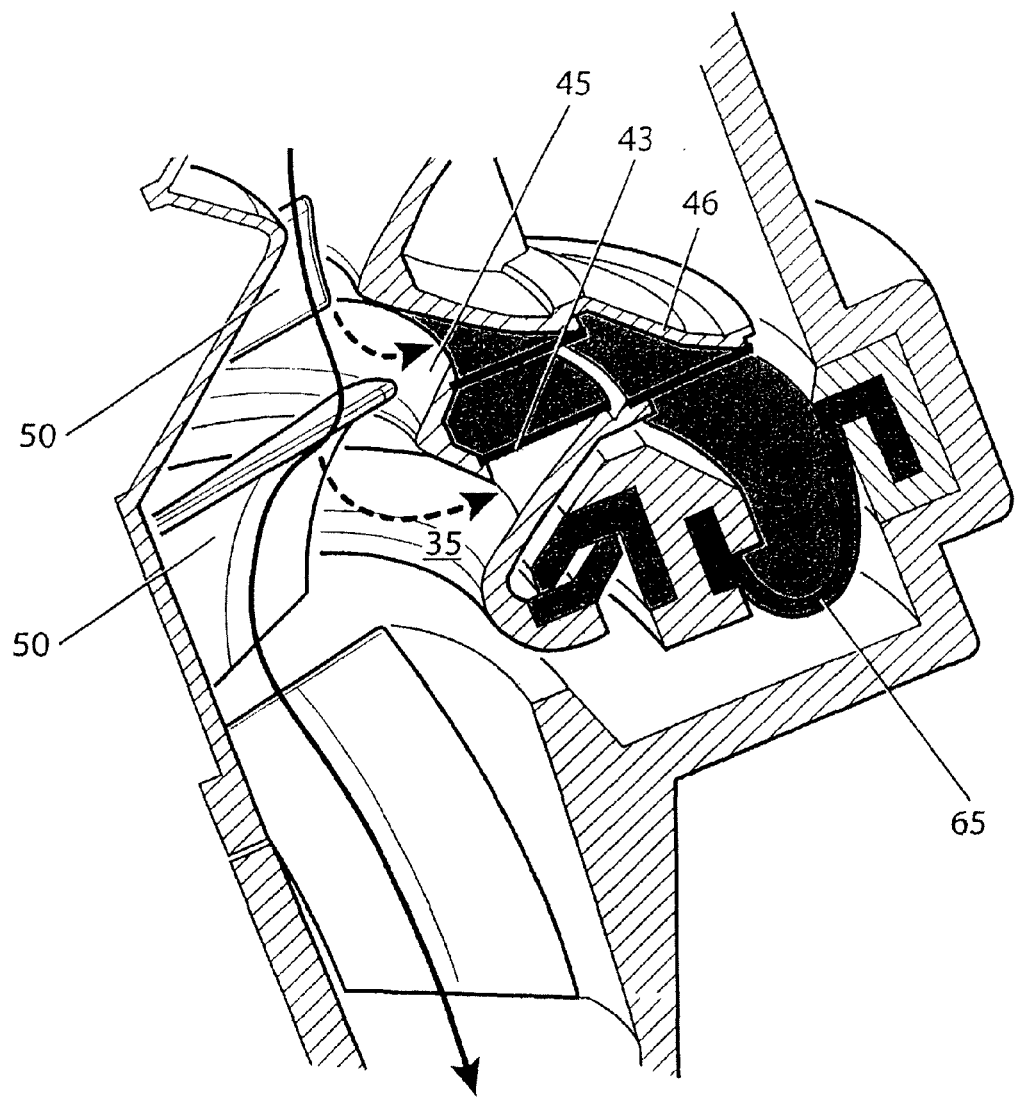
FIG. 4 is a schematic isometric view of an end portion of the rotor assembly of FIG. 3.

A duct 58 extends to a rotor assembly 20 having an inlet 21. The inlet 21 is best seen in FIG. 2. From the inlet 21 air is delivered to a rotor 22 contained in a chamber 23. The chamber 23 communicates with an outlet 24 via which air exits.

The inlet 21 provides an end mounting 25 for the drive shaft 26. Surrounding the mounting 25 is a wall 27. The wall 27 is arcuate and extends angularly about the longitudinal axis 27. The axis 67 being the longitudinal axis of the shaft 26 and chamber 23.

The chamber 23 is surrounded by a wall 28 that extends from the wall 27. The wall 27 surrounds a cavity 29 to which the air is delivered from a duct 18. However, air entering the chamber 29 from the duct 18 changes direction causing particles (generally heavier) to enter the particle outlet 30 so as to be directed to a dust receiving chamber 31.

Air enters the chamber 29 and is caused to circulate about the axis 67 with all the air being directed through annular opening 32. The annular opening 32 surrounds a flange 33 fixed to an adjacent one end of the shaft 26. The flange 33 has radially fins 34 that engaged the air and further enhance angular movement of the air about the axis 27. The fins 34 also cause the air to move axially relative to the axis 67.

The annular opening 32 delivers air to an annular passage 35 extending through the rotor 22.

The rotor 22 includes the shaft 26, supported by bearings 37, that is driven by pulley 38. The rotor 22 further includes fan blades 50 which causes the air to move longitudinally of the passage 35 as well as angularly about the axis 67. The rotor 22 also includes an inner sleeve 39 that extends longitudinally of and angularly about the axis 67 and provides a plurality of annular ridges 40. The sleeve 39 is attached to the shaft 26 and therefore rotates with the shaft 26 together with the blades 50.

Figure 5:
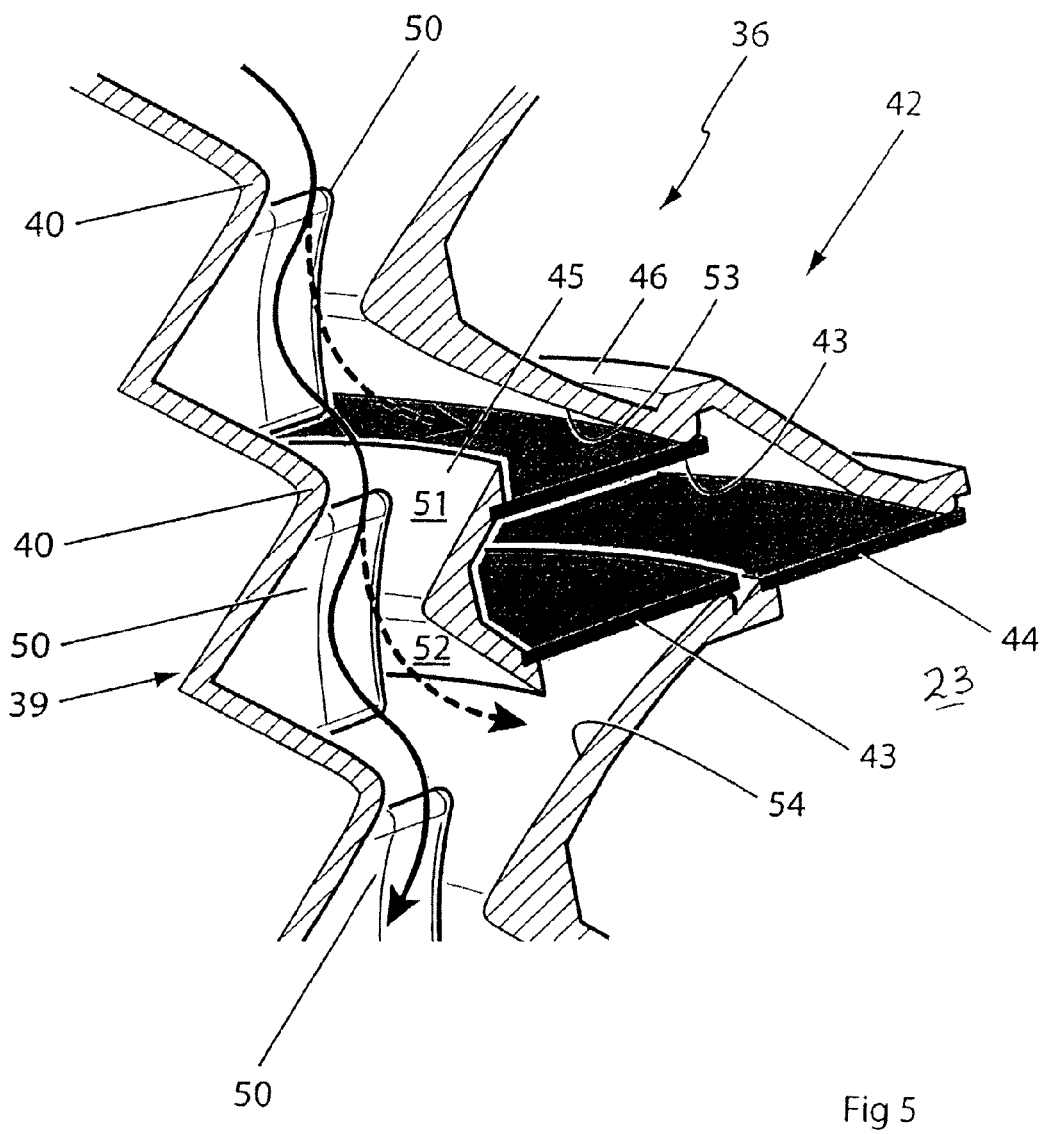
FIG. 5 is a schematic isometric view of an intermediate portion of the rotor assembly of FIG. 3.

The rotor 22 further includes an outer sleeve 36. The sleeve 36 has a gate assembly 41 that surrounds the passage 35, with the passage 35 being located between the assembly 41 and the sleeve 39. The gate assembly 41 includes a plurality of gates 42. In this embodiment, the gates 42 include annular resilient flanges 43 and 44. The flanges 43 and 44 are supported by annular mountings 45 and 46. The flanges 43 and 44 are formed of resilient flexible material and are movable from a closed position (as shown in FIG. 5) to an open position allowing collected particles to enter the annular cavity 23 surrounding the sleeve 36. From the cavity 23, collected material is moved via air to the outlet 30. The flanges 43 and 44 are resiliently urged to the closed position.

The opening 32 is surrounded by an annular flange 48, at the extremity of which there is provided an annular passage 49 which provides for the delivery of air and collected material to the outlet 30 from the cavity 23. The flange 48 is part of the rotor assembly 20.

Figure 6:
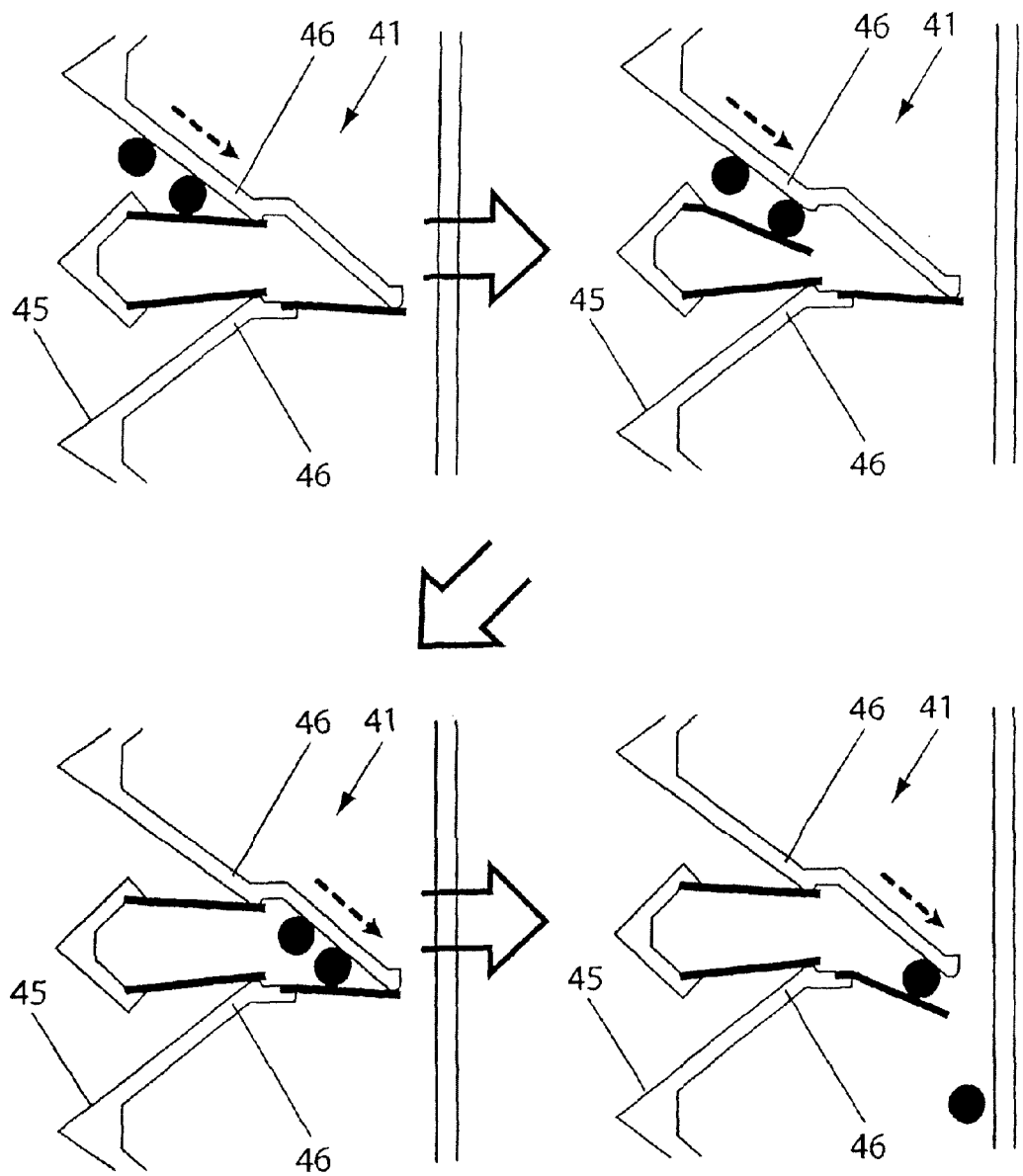
FIG. 6 is a sequence of schematic side elevations illustrating operation of gates employed in the rotor assembly of FIG. 3.

Each of the flanges 43 and 44 is mounted adjacent its radially inner edge and is movable angularly as best seen in the sequence of illustrations contained in FIG. 6. Initially, the flanges 43 and 44 are in a closed position until they collect sufficient material. Centrifugal force, resulting form rotation of the rotor 22, is applied to the material which causes one or both the flanges 43 to deflect to an open position. The collected material then flows to engage flange 44. The material again accumulates until centrifugal force opens the flange 44 to provide the delivery of collected material to the cavity 47. The flanges 43 and 44 are resiliently urged to the closed position.

The ridges 40 aid in directing particle matter toward the gates 42.

At the downstream end of the passage 35 there is provided an annular wall 65, that closes the cavity 47, that is fixed to the wall 28.

The mounting 45 has surfaces 51 and 52 that converge toward the axis 27 so as to provide an apex. The surfaces 51 and 52 are annular. The mounting 46 provides annular surfaces 53 and 54 that converge radially outward.

Internally of the duct 17, there is provided a plurality of shaped bars 55 between which air passes to flow from the outlet 16 to the duct 18. The bars 55 engage particles to aid in directing particles to the gate 19 for collection. Air passes between the bars 55, with at least some particles engaging the bars 55 so as to be removed from the airstream for delivery to the gate 19.

Figure 7:
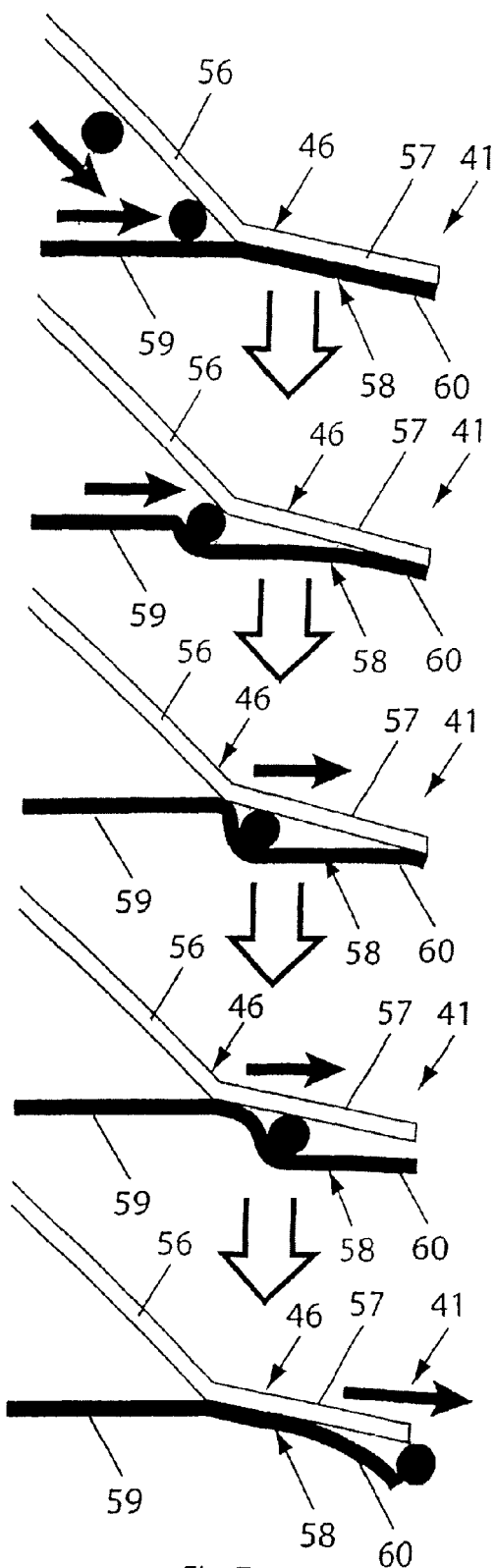
FIG. 7 is a sequence of schematic side elevations illustrating an alternative gate assembly to that of FIG. 6.

In FIG. 7, there is schematically depicted an alternative construction for the gate assemblies 41. In the embodiment of FIG. 7, the mounting 46 has two annular portions 56 and 57 that cooperate with a single resiliently formed gate flange 58. The portions 56 and 57 are inclined, while the flange 58 has a first portion 59 joined to a second portion 60. The portions 59 and 60 resiliently deform to essentially replace the two flanges 43 and 44 of the previous embodiment. The flange 58 initially collects the dust particles adjacent the portion 56. When sufficient material has been accumulated, the centrifugal force applied to that material deforms the flange 58 so that the material passes to adjacent the portion 57. When again sufficient material is collected, material is expelled by resilient deformation of the flange 58.

Figure 8:
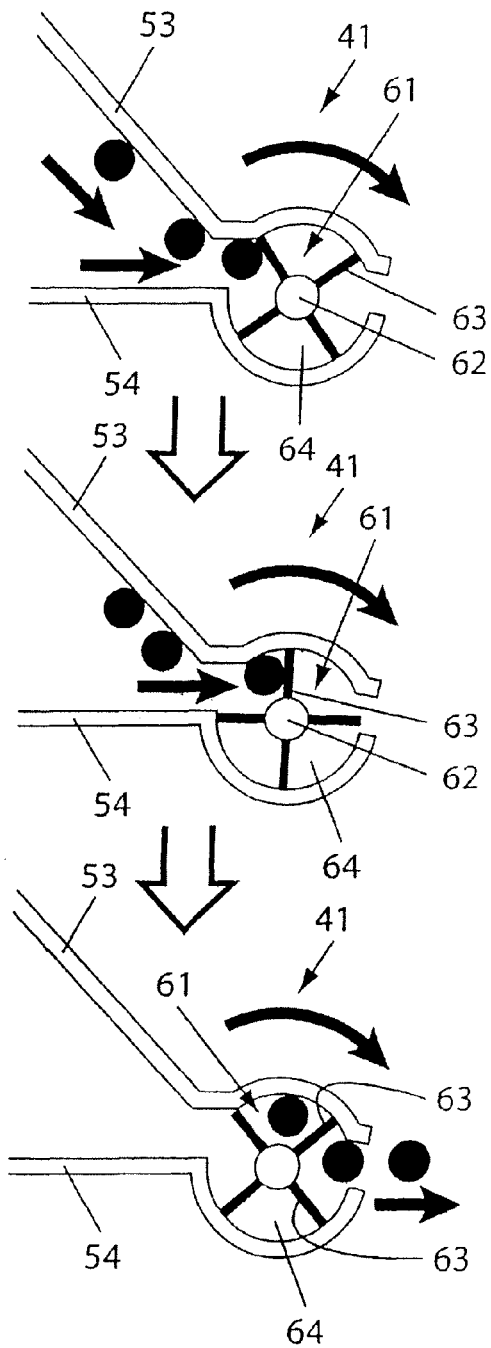
FIG. 8 is a sequence of schematic side elevations illustrating an alternative gate arrangement to that of FIG. 6.

In the embodiment of FIG. 8, the flanges 43 and 44 are replaced by a rotatable gate member 61. The gate member 61 has a central shaft 62 from which there extends radially veins 63. The veins 63 provide compartment 64 that collect the material and provide for delivery to the cavity 47. Preferably, a resistance would be applied to the shaft 62 so that the member 61 only rotates as a result of centrifugal force being applied to the collected material.

Figure 10:
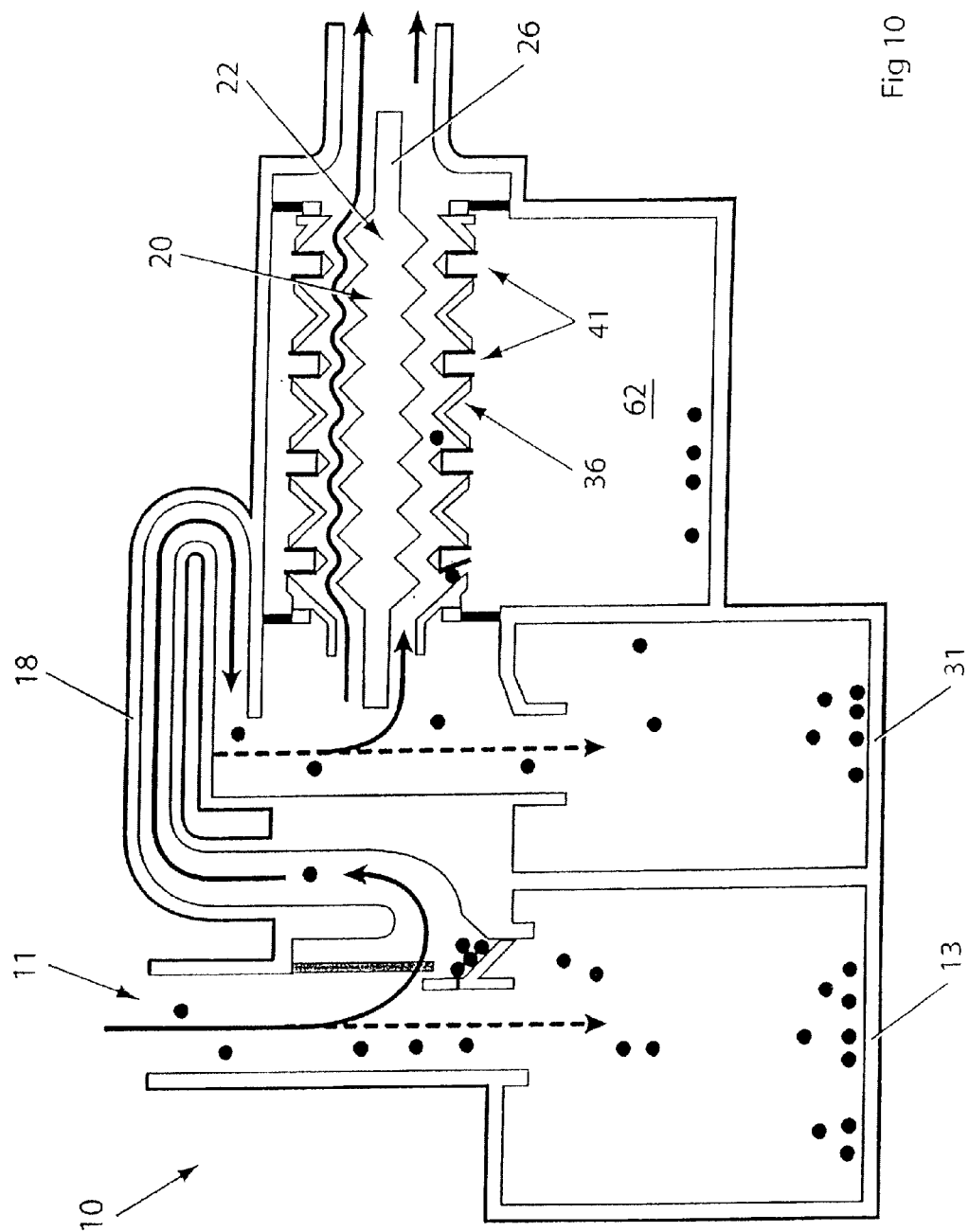
FIG. 10 is a schematic side elevation of a modification of the vacuum cleaner of FIG. 1.

In the embodiment of FIG. 10, the cavity 47 is replaced with a collection chamber 62.

Figure 11:
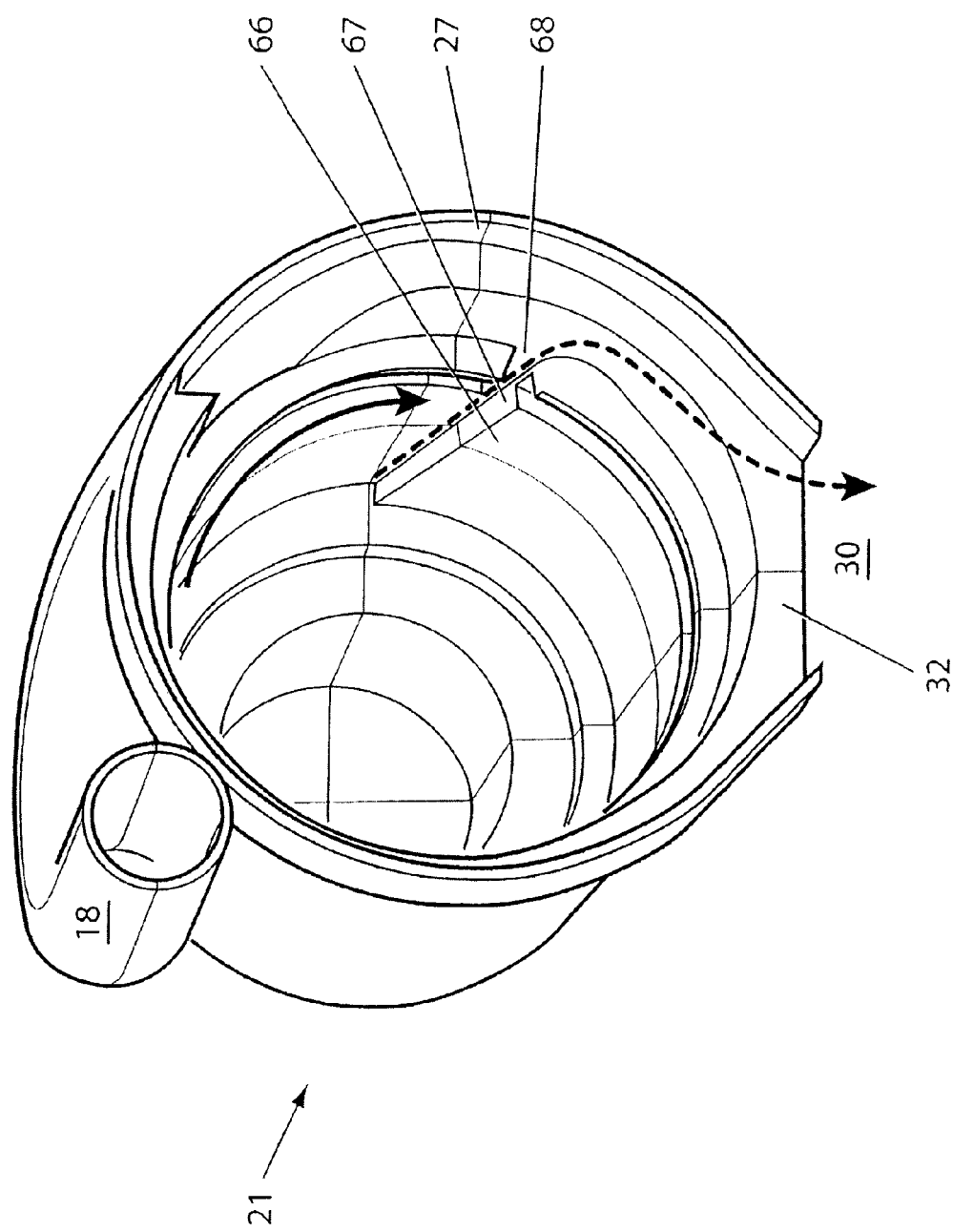
FIG. 11 is a further schematic isometric view of the vacuum cleaner portion of FIG. 1.

In FIG. 11 there is schematically depicted the inlet 21 of FIG. 2. The wall 27 is provided with a surface 66 that aids in directing particles to the outlet 30. The surface 66 may include a sloped portion that terminates with a surface 67, or a ridge or fin (not illustrated) to aid in directing particles to the outlet 30. The surface 66 may also include a slot 68 that receives collected particles and directs them to the outlet 30. The slot 68 could be positioned adjacent the abovementioned ridge or fin.

Figure 12:
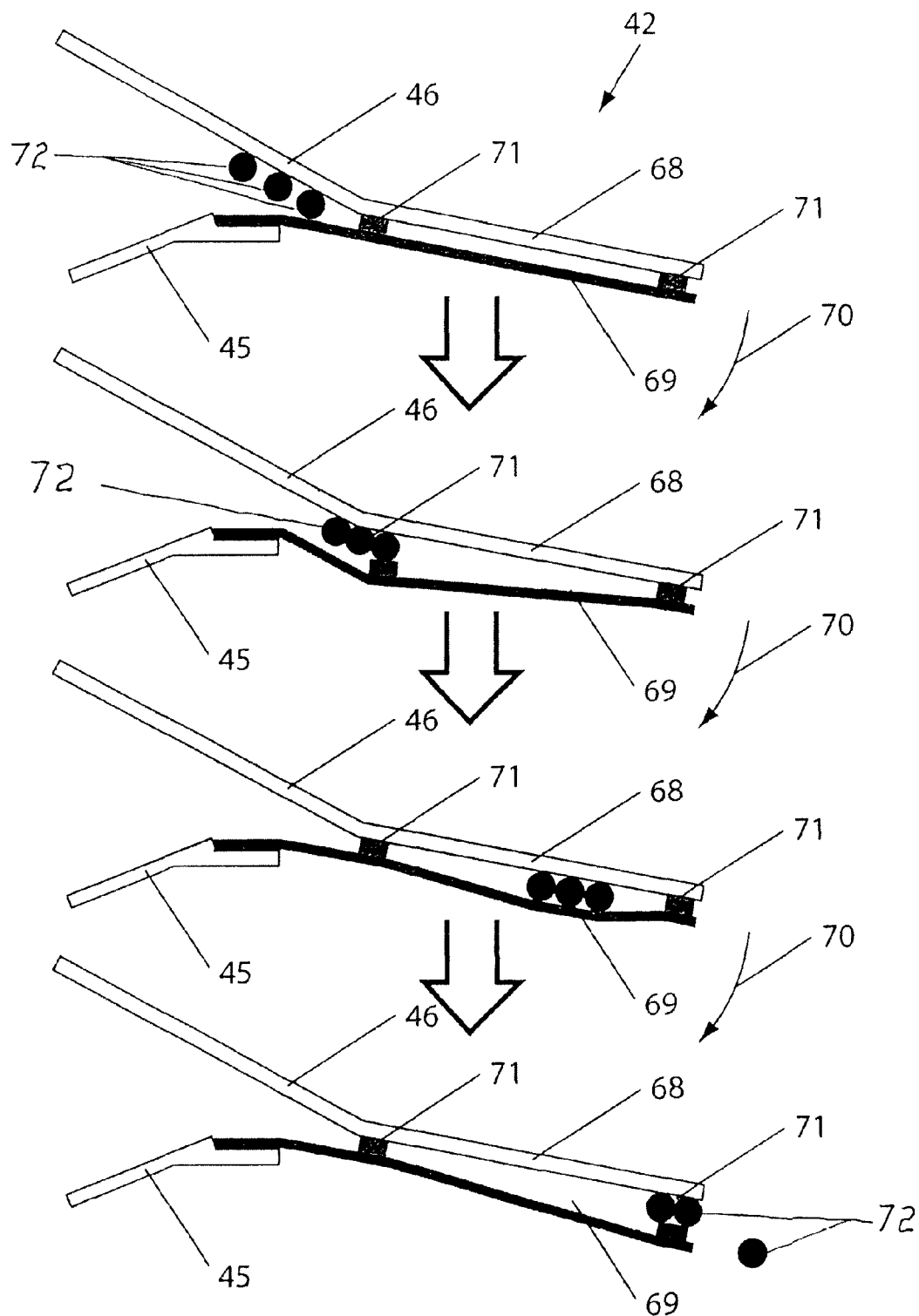
FIG. 12 is a schematic side elevation of a modification of the gates employed in FIGS. 4, 5 and 6.

In the embodiment of FIG. 12, the previous gates 42 are modified. In this embodiment the annular mounting flanges 45 and 46 converge radially outwardly, with the mounting flange 46 having a radially extending annular plate 48. Extending radially from the mounting flange 45 is a deformable annular flange 69. The annular flange 69 is deflectable angularly in the direction 70 to provide for the flow of collected dust 72 past the gate 42. If required annular sealing rings 71 can be provided between the flanges 68 and 69 to aid in retaining dust until the valve 42 is open. FIG. 12 shows the sequence of operation of the gate 42.

The invention claimed is:

1. A device to separate particles from a gas stream comprising:
   a chamber having an inlet and an outlet between which the gas stream flows;
   a rotor mounted in the chamber for rotation about a rotation axis, the rotor including a longitudinal passage extending through the rotor along which the gas stream passes in moving from the inlet to the outlet of the chamber;
   a plurality of gates rotatable with the rotor and located radially outward of the passage which collect the particles from the gas stream passing through the passage, each of the gates being operable to move between a closed position for collecting the particles at the gate, and an open position providing for delivery of the collected particles from the gate, wherein each gate includes an upstream gate portion and a downstream gate portion, with the upstream gate portion being operable in an open position and a closed position, with the upstream gate portion in the open position providing for the flow of particles to the downstream gate portion, with the downstream gate portion being operable in an open position and a closed position, with the downstream gate portion in the open position providing for the delivery of particles to the cavity, wherein particles collect between the upstream gate portion in the closed position and the downstream gate portion in the closed position, wherein each of the plurality of gates moves to an open position by the collected particles acting under a centrifugal force; and
   a cavity into which the particles are delivered from the plurality of gates.

2. The device of claim 1, wherein the rotor includes fan blades rotatable with the rotor and operable to move the gas stream axially along the direction of the rotation axis.

3. The device of claim 1, wherein each of the plurality of gates is annular in configuration.

4. The device of claim 1, wherein each of the plurality of gates includes a resilient flange resiliently urged to the closed position.

5. The device of claim 1, wherein each of the plurality of gates includes a gate member angularly movable to provide for the passage of the particles past the gate.

6. The device of claim 1, wherein each of the plurality of gates includes an annular resilient flange having an upstream portion and a downstream portion, each portion being resiliently movable between an open position and a closed position.

7. The device of claim 1, wherein the inlet includes an inlet duct causing the gas stream to follow an arcuate path to urge particles in a predetermined direction, and the device further includes an inlet gate which collects particles, the inlet gate being operable in an open position and a closed position, with the inlet gate in the open position providing for the removal of particles from the gas stream.

8. The device of claim 1, wherein the inlet includes a plurality of bars on the path between which the gas stream passes, with the bars being adapted to engage particles to aid in removing particles from the gas stream for delivery to the inlet gate.

9. The device of claim 1, wherein the inlet includes an upstream inlet portion and a downstream inlet portion, the downstream inlet portion communicating with the rotor and causing particles to pass along an arcuate path to urge particles in a predetermined direction so as not to enter the rotor.

10. The device of claim 9, wherein the cavity is a first chamber to receive the particles, and the device includes a second chamber, with the first chamber being in communication with the downstream inlet portion so as to receive particles therefrom, the second chamber communicating with the upstream inlet portion so as to receive particles therefrom.

* * * * *